(12) United States Patent
Basak (10) Patent No.: US 9,276,821 B2
(45) Date of Patent: Mar. 1, 2016

(54) GRAPHICAL REPRESENTATION OF CLASSIFICATION OF WORKLOADS

(71) Applicant: NetApp, Inc., Sunnyvale, CA (US)

(72) Inventor: Jayanta Basak, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 195 days.

(21) Appl. No.: 13/945,797

(22) Filed: Jul. 18, 2013

(65) Prior Publication Data
US 2015/0026582 A1  Jan. 22, 2015

(51) Int. Cl.
*H04L 12/24*  (2006.01)
*H04L 12/26*  (2006.01)

(52) U.S. Cl.
CPC .............. *H04L 41/22* (2013.01); *H04L 41/142* (2013.01); *H04L 43/045* (2013.01)

(58) Field of Classification Search
CPC ................ G06F 11/30–11/3696; H04L 41/22; H04L 41/142; H04L 43/045
See application file for complete search history.

(56) References Cited

U.S. PATENT DOCUMENTS

| | | | | |
|---|---|---|---|---|
| 7,395,187 | B2 * | 7/2008 | Duyanovich | G06F 11/3409 702/183 |
| 2002/0116441 | A1 * | 8/2002 | Ding | G06F 9/5011 718/105 |
| 2006/0085742 | A1 * | 4/2006 | Harold et al. | 715/517 |
| 2007/0028219 | A1 * | 2/2007 | Miller et al. | 717/124 |
| 2007/0198679 | A1 * | 8/2007 | Duyanovich | G06F 11/3409 709/223 |
| 2007/0220371 | A1 * | 9/2007 | Duyanovich | G06F 11/3447 714/49 |
| 2008/0126858 | A1 * | 5/2008 | Barras | 714/25 |
| 2008/0195369 | A1 * | 8/2008 | Duyanovich et al. | 703/22 |
| 2009/0083737 | A1 * | 3/2009 | Ben-Yehuda | G06F 11/3409 718/100 |

OTHER PUBLICATIONS

Yoo, R. M., Hsien-Hsin Lee, Han Lee, and Kingsum Chow. (2007). Hierarchical means: Single number benchmarking with workload cluster analysis. IEEE 10th International Symposium on Workload Characterization, 204-213.*
Ellard, D., Johathan Ledlie, Pia Malkani, and Margo Seltzer. (2003). Passive NFS Tracing of an Email and Research Workload. Conference on File and Storage Technology 2003, 203-217.*
Gordo, Albert, JoséA. Rodriguez-Serrano, Florent Perronnin, and Ernest Valveny. (Jun. 20, 2012). Leveraging category-level labels for instance-level image retrieval. CVPR 2012, 3045-3052.*

* cited by examiner

*Primary Examiner* — Jennifer To
*Assistant Examiner* — Liang Li
(74) *Attorney, Agent, or Firm* — Klein, O'Neill & Singh, LLP (57) ABSTRACT

Technology is disclosed for graphically representing classification of workloads in a storage system. Workload classification is graphically represented to the user by mapping workload signatures of the workloads to a grid. When the workload signatures are mapped to the grid, a number of clusters are formed in the grid. Each of the clusters represents workloads of a particular category. Mapping the workload signature to the grid includes mapping a high-dimensionality workload signature vector to a low-dimensionality grid.

20 Claims, 9 Drawing Sheets

GRAPHICAL REPRESENTATION OF CLASSIFICATION OF WORKLOADS

TECHNICAL FIELD

At least one embodiment of the present disclosure pertains to network storage systems and more particularly to graphically representing classification of workloads of a network storage system.

BACKGROUND

The type of workload managed by a computing entity (or "computing system"), e.g., a database management system or a network storage system, is a key consideration in tuning the computing entity. For example, allocation of resources, e.g., main memory, can vary significantly depending on whether the workload type is Online Transaction Processing (OLTP) or Decision Support System (DSS). It would be preferable for administrators of the computing entity, e.g., database administrators or system administrators, to recognize significant shifts in workload types that would require reconfiguring the computing entity, co-locating similar workloads, or taking other actions to maintain acceptable levels of performance.

Currently, the identification of a workload's type is generally performed manually, e.g., by pre-classifying a given workload into a class, for example, "test," "web server," or "database," where the class identifies an expected load pattern and/or behavior. For example, a web server may employ few memory resources but a tremendous amount of network resources. On the other hand, a database may employ a tremendous amount of processing and storage resources. However, human classification of workload type is becoming increasingly difficult as the complexity of workloads increases. Furthermore, the computing entity may execute several workload types in parallel. To analyze these different workloads, administrators may generate reports having details of these workloads and their types. However, the reports are complex, often contain too much information, and are not typically very user-friendly. Consequently, it is a cumbersome task for an administrator to read and analyze the reports. Accordingly, current workload identification techniques are limited in their capabilities and usefulness.

BRIEF DESCRIPTION OF THE DRAWINGS

One or more embodiments of the present disclosure are illustrated by way of example and not limitation in the figures of the accompanying drawings, in which like references indicate similar elements and in which.

DETAILED DESCRIPTION

Note that references in this specification to "an embodiment", "one embodiment", or the like, mean that the particular feature, structure or characteristic being described is included in at least one embodiment of the exemplary technology. Occurrences of such phrases in this specification do not necessarily all refer to the same embodiment; however, neither are such occurrences mutually exclusive necessarily. Further, note that the terms "network storage controller," "network storage server," or "storage server" are used interchangeably, and the terms "network storage system" or "storage system" are used interchangeably.

Technology is disclosed for graphically representing a classification of workloads executing in a computing environment ("the technology"), e.g., in a network storage system. In various embodiments, the classification of workloads is graphically represented to a user (e.g., an administrator) by mapping workload signatures to a grid. A workload signature includes parameters that are representative of a corresponding workload. Mapping the workload signatures to the grid results in formation of one or more clusters in the grid. The clusters can represent workloads of a particular class or category.

More specifically, workload signatures can be mapped to cells in the grid. Workloads with similar workload signatures are mapped to cells in a particular "neighborhood" forming a cluster in the grid. Clusters are created in the grid as a result of the mapping. The user can infer the category of the workload depending on the cluster to which the particular cell belongs. New workloads are mapped to either existing clusters or can form new clusters indicating new categories of workloads.

The workload signature is high-dimensionality vector, for example, a sixty four bit vector. The grid is a low-dimensionality grid, for example, a two-dimensional grid. The high-dimensionality workload signature vector is mapped to the low-dimensionality grid using topography mapping techniques, e.g., Kohonen self-organizing maps (SOM). The graphical representation constructs the two-dimensional grid and different regions or clusters of cells in the grid represent different categories of workloads.

The graphical representation of the workload classification enables an administrator to obtain an understanding of different types of workloads executing in the network storage system, and to infer what type of workloads are executing at any particular time. The workload signatures may be obtained periodically and mapped to the grid. This enables an administrator to understand the evolution of workloads over time, and take actions to fine tune the network storage system for different types of workloads.

The embodiments described herein relate to a network storage server merely as an example, to facilitate description of the techniques being introduced. It will be recognized, however, that the technology introduced here can be applied to other types of data processing systems as well.

Figure 1:
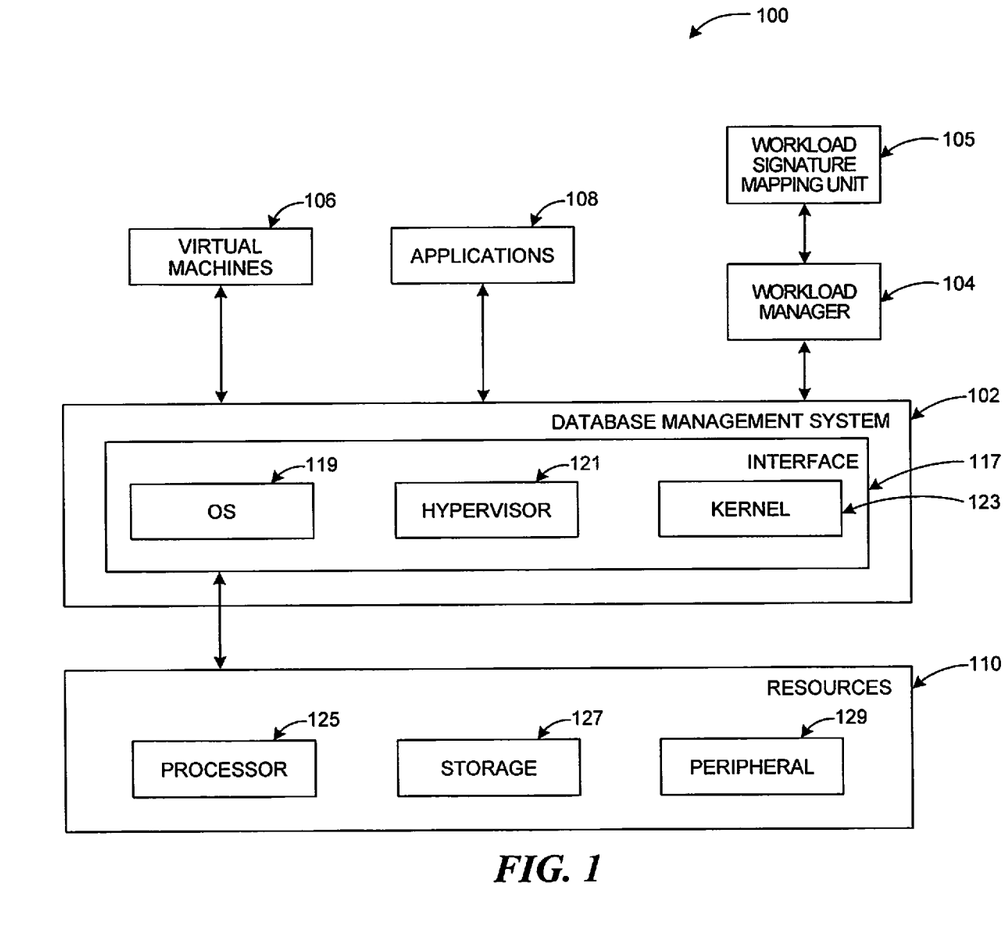
FIG. 1 is a block diagram illustrating a network storage system environment in which the technology can operate in various embodiments.

FIG. 1 is a block diagram illustrating a network storage system environment in which the technology can operate in various embodiments. A storage system 100 includes a database management system ("DBMS") 102 associated with resources 110 via an interface 117. The resources 110 can include, for example, a processor 125, a storage 127 (e.g., a storage device), peripheral 129, and/or any other physical hardware resource, virtualized hardware resource, software resource, etc. that computing devices are capable of using.

In various embodiments, DBMS 102 hosts a virtual machine 106, which may include, for example, a guest OS (not illustrated), a workload manager 104, and/or one or more guest applications 108, where the hosted application represents a workload of the DBMS 102. Further, the DBMS 102 can include an interface 117 which may in turn include a hypervisor 121. The hypervisor 121 can execute on processor 125, and host one or more virtual machines, e.g., virtual machines 106. The hypervisor 121 may also selectively serve requests of virtual machines 106 to utilize resources 110, e.g., storage 127, and/or peripheral 129. In various embodiments, the interface 117 of the DBMS 102 includes an OS 119, and/or a kernel 123. The OS 119 and/or kernel 123 may run on processor 125, and may manage one or more applications, e.g., applications 108. The OS 119 and/or kernel 123 may also selectively serve requests of applications 108 to utilize the resources 110.

In some embodiments, the workload manager 104 of system 100 gathers information associated with other workloads, e.g., application 108, currently being hosted on the system 100 (a "workload"). In some embodiments, the workload manager 104 may gather the data by sampling operations including, for example, continuous monitoring, periodical monitoring, random monitoring, and/or pseudo-random monitoring. Based on the gathered information, the workload manager 104 further determines a workload signature for the runtime workloads and classifies the runtime workloads according to their workload signature. The information gathered by the workload manager 104 may include, for example, information related to a response of time of the DBMS 102 for a particular workload, requests from the runtime workloads for resource allocations, responses to the requests for resource allocations, actual usage of resources by the workloads, network traffic to/from the DBMS 102, one or more indications of a state of operation of the DBMS 102, a parameter related to a network activity performed by DBMS 102, a parameter related to storage channel communications performed by DBMS 102, a parameter related to resource utilization by DBMS 102, a parameter related to requests by DBMS 102 to utilize resource 110, and/or any other suitable detectable parameter related to operations performed by DBMS 102 for the workload with respect to resource 110.

In some embodiments, workload manager 104 can determine the workload signature of a runtime workload by sampling various values for parameters of the runtime workload. Examples of parameters are read percentage, write percentage, other percentage, random read percentage and random write percentage. Based on the sampled values of the parameters, the workload manager 104 identifies one or more parameters that are significant for predicting a response time of DBMS 102. In some embodiments, the response time of the DBMS 102 is the time consumed for responding to service requests from the runtime workload. In some embodiments, the workload manager identifies the one or more significant parameters by applying a statistical analysis to the sampled values to determine a correlation of the parameters to the response time of the DBMS 102 and identifying the particular parameter based on the determined correlation. The workload manager 104 then determines a candidate workload signature of the runtime workload as a function of the parameter values, response time and the one or more parameters that are significant for predicting the response time. In some embodiments, the workload manager 104 can determine the candidate workload signature by determining a similarity between the identified one or more significant parameters and other parameters of the workload, for example, using a statistical function for matching parameters. Additional details with respect to the structure of the workload signature are discussed below in relation to FIG. 7.

The workload manager 104 includes a database (not illustrated) of (i) workload classifications (not illustrated) that correspond to different workload types and (ii) workload signatures that correspond to the workload classifications. In some embodiments, the workload manager 104 classifies the runtime workload of DBMS 102 by selecting a workload classification from the database of workload classifications based on a comparison between a candidate workload signature and the stored workload signatures. For example, the workload manager 104 can perform approximate matching of the candidate workload signature against the stored workload signatures and choose a workload classification for the runtime workload as the classification that corresponds to one of the workload signatures with the best match with the candidate workload signature. The best match between the runtime workload signature and workload signatures can be determined using any suitable match recognition method and/or algorithm, for example, a nearest neighbor matching algorithm and/or any other matching algorithm.

The workload classifications can also include user defined classifications, e.g., categories, types, etc. The categories can be based on types of applications, for example, "Microsoft Exchange", "Oracle", "Virtual Desktop Interface (VDI)", "Enterprise Business Intelligence (EBI)", etc. In various embodiments, the workload categories can be based on the nature of workloads, for example, "read intensive," "write intensive," etc.

The storage system 100 includes a workload signature mapping unit 105 that creates a graphical representation of the classification of the workloads executing in the system 100. The workload signature mapping unit 105 maps the workload signatures to a grid and creates a graphical representation of the classification. In some embodiments, the workload signature mapping unit 105 receives the workload signatures from a workload classifier (not illustrated) over a rolling window (for a certain duration of time) and maps the workload signatures to the grid to show how the cluster is moving in the grid.

Figure 2A:
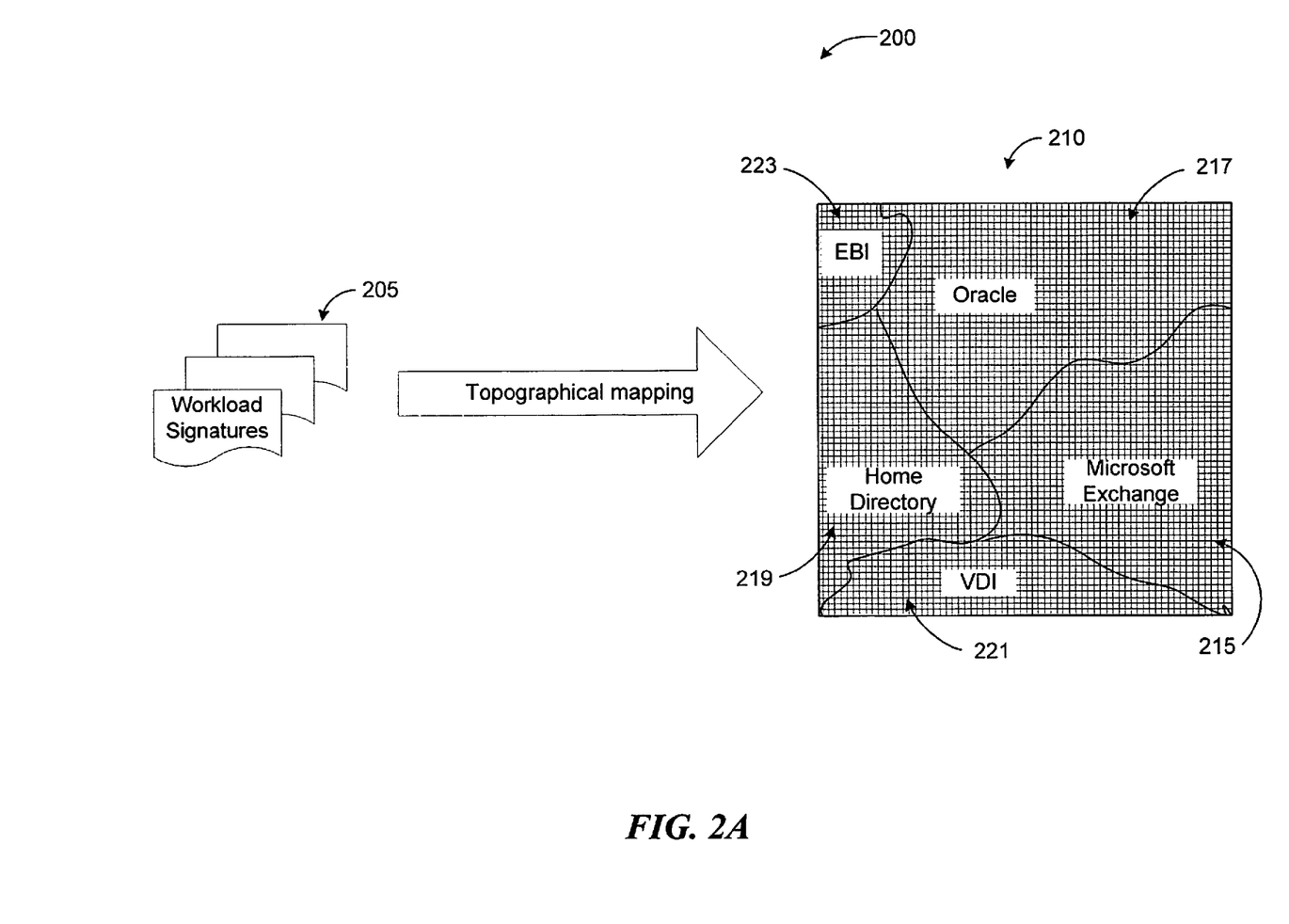
FIG. 2A is a block diagram illustrating a graphical representation of a classification of workloads executing in a network storage system consistent with various embodiments.

FIG. 2A is a block diagram illustrating a graphical representation of a classification of workloads executing in a network storage system consistent with various embodiments. Workload signatures 205 represent the workloads executing in a network storage system, e.g., storage system 100 of FIG. 1. In some embodiments, a graphical representation of workload classification is generated by topographically mapping the workload signatures 205 to a grid 210. A user can visualize the different types of workloads executing in the storage system 100 graphically using the grid 210. The graphical representation constructs the grid 210 in which different regions/clusters of cells represent different categories of workloads executing in the storage system 100. The workload signatures 205 are mapped to particular cells in the grid 210, and the category of the corresponding workload is inferred based on the cluster to which the particular cell belongs.

Figure 7:
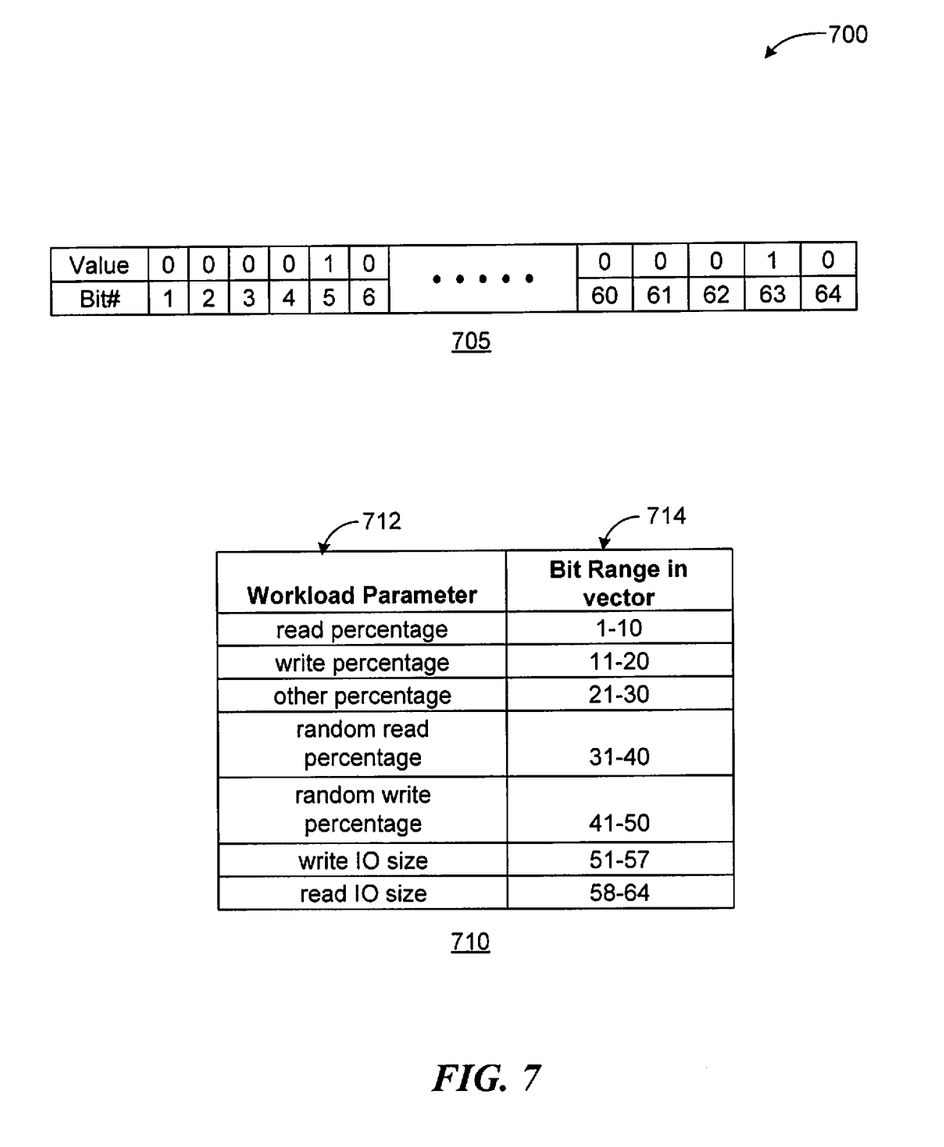
FIG. 7 is a bit vector diagram illustrating an example of a sixty-four bit workload signature and a workload parameter bit definition table.

In some embodiments, the workload signatures 205 include of parameters that are representative of the corresponding workload. The parameters can be represented as a vector. In some embodiments, the parameters can be included in the vector using as many as sixty-four bits. FIG. 7 provides an example of such a work load signature. However, mapping a sixty four dimensionality vector to a low dimensionality grid, for example, a two-dimensionality grid, e.g., the grid 210 or a three-dimensional grid, needs high-dimensionality to low-dimensionality mapping techniques. In some embodiments, topographical mapping techniques, e.g., Kohonen SOM, that map a high-dimensionality space to a low-dimensionality space can be used to map the workload signatures 205 to the two-dimensional grid 210. (FIGS. 3 and 5 and their corresponding detailed description describe Kohonen SOM mapping techniques in further detail.) However, in other embodiments, various other topographic mapping techniques may be used.

In the Kohonen SOM technique, vectors with similar values are mapped to cells that are close to each other in the grid 210 and the vectors with different values are mapped to farther cells in the grid 210. The grid 210 can be of a predefined size (m×n). When the workload signatures 205 are mapped to the grid 210, a subset of the workload signatures 205 that have similar values is mapped to cells in a particular "neighborhood". Over a period of time, the particular neighborhood appears as a cluster of cells. Different types of workloads will have different workload signatures. For example, "Microsoft Exchange" workload has a different workload signature from that of an "Oracle" workload. Similarly, a "read-intensive" workload can have a different workload signature from that of a "write-intensive" workload. Accordingly, in some embodiments, the workload signatures of "Microsoft Exchange" workload (or at least a set of them) and the workload signatures of "Oracle" workload (or at least a set of them) are mapped to cells in different clusters of the grid, as illustrated. Thus, a number of clusters are formed in the grid 210 for different categories of workload. As illustrated in FIG. 2, the grid 210 includes five clusters: a "Microsoft Exchange" workload 215, an "Oracle" workload 217, a "HomeDirectory" workload 219, a "VDI" workload 221, and an "EBI" workload 223.

Figure 2B:
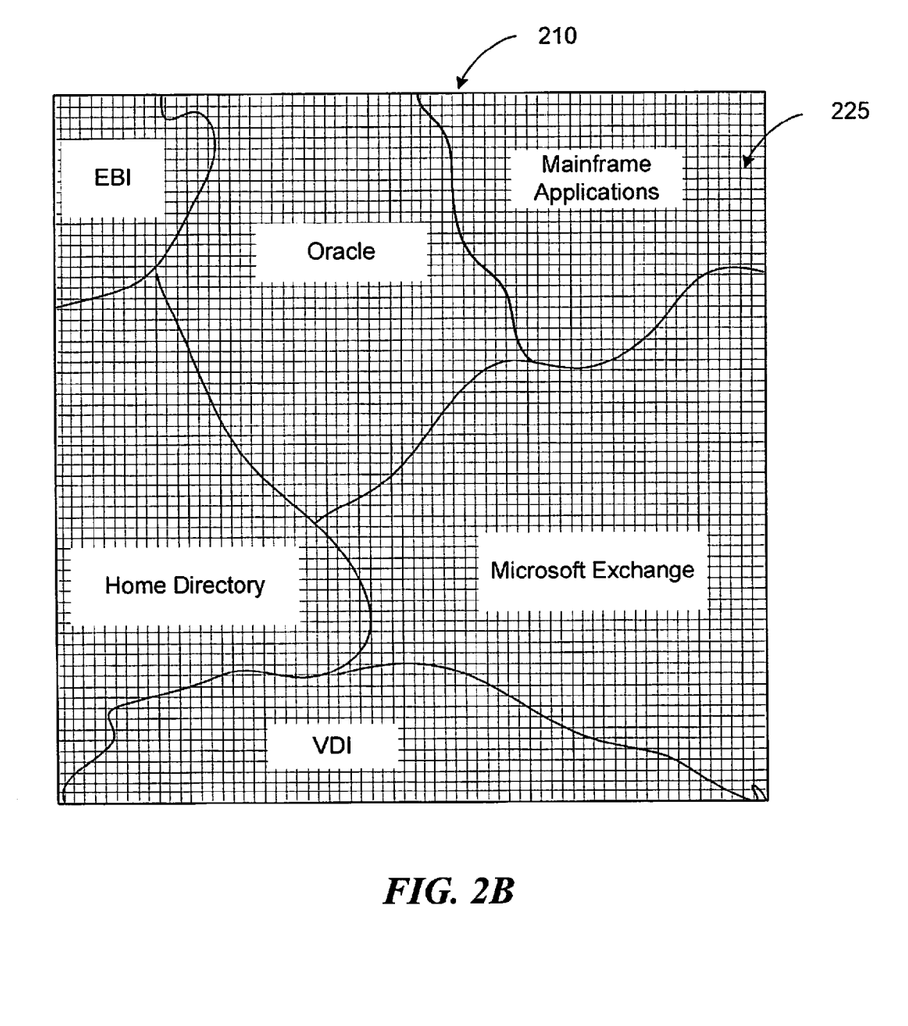
FIG. 2B is a topological map diagram illustrating a topological map, consistent with various embodiments.

The graphical representation of the classification of workload, provides various analytical information to administrators. For example, at a given instant of time, an administrator can determine what types of workloads are executing in the storage system 100. In another example, the administrator can monitor the grid 210 to determine how a particular workload is evolving over a period of time. The administrator can achieve this by creating workload signatures of different workloads at regular intervals of time and mapping them to the grid 210 at regular intervals. If the nature of a particular type of workload is changing, the cluster representing the particular workload may gradually move across the grid 210 in a particular trajectory reflecting the change. In another example, when new workload signatures are mapped to the grid 210, new clusters may be formed indicating that new categories of workloads are being executed. FIG. 2B is a topological map diagram illustrating a topological map, consistent with various embodiments. FIG. 2B illustrates an example where a new cluster 225 indicating workloads of category "Mainframe Applications" are generated. In another example, based on the knowledge of the types of workloads executing in the system, an administrator such as an administrator of the storage system 100 may further configure the storage system to support a particular category of workload to improve the overall efficiency of the storage system 100. In another example, the administrator can gain an understanding of the effect of co-existence of certain types of workloads.

Further, in the graphical representation of the grid 210, the administrator may provide customized annotations to different clusters. That is, the clusters need not be named after the name of the application creating the workload. For example, the administrator may annotate the clusters based on other parameters such as nature of workloads, for example, "read-intensive," "write-intensive"; region of users, for example, "asia-users," "america-users," etc.

In some embodiments, before the grid 210 can be used to classify the workloads, the grid 210 is calibrated. The calibration can be done in two steps. A first step trains the grid 210 to map a workload signature to a particular cell in the grid. Initially, a workload signature maps to one or more cells of the grid 210. The grid 210 can be trained using a Kohonen SOM technique or other suitable technique to map the workload signature to a particular cell. Additional details of training the grid 210 are described below with reference to FIGS. 3 and 5. In some embodiments, a second step identifies correspondence between clusters and workload categories. In some embodiments, to identify the clusters, the grid 210 is mapped with a set of workloads of a known category. The resulting cluster in the grid is annotated with the preferred category name. The second step may be repeated for a predefined number of known categories. After the predefined number of categories are identified, the different clusters are annotated with category names as illustrated in grid 210.

After the calibration process is complete, the grid 210 is in a stable position and any incoming workload signature can be mapped to a single cell in the grid 210. The category of the workload is identified based on the cluster in which the single cell is located.

Figure 3:
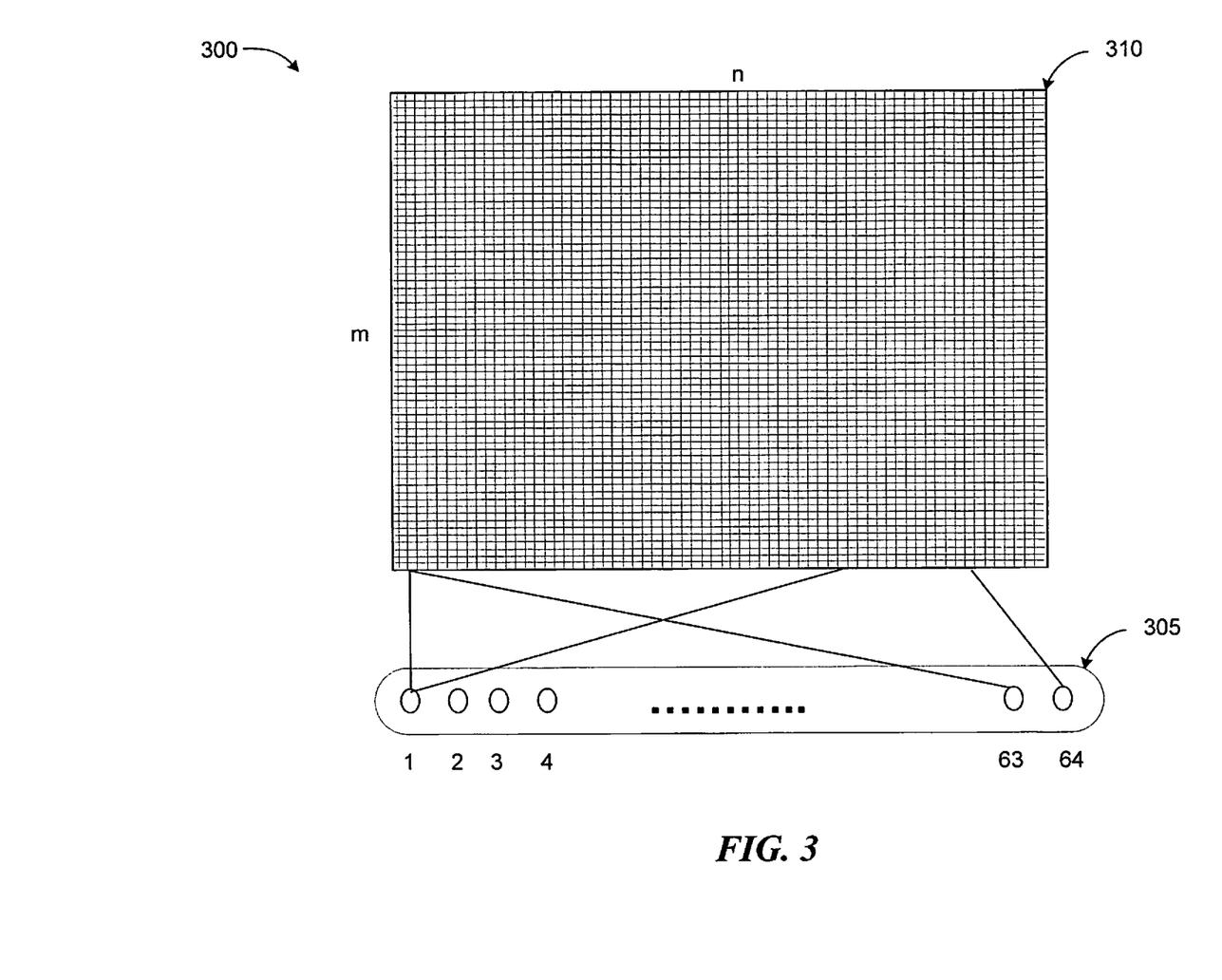
FIG. 3 is a block diagram illustrating an example of training a two-dimensionality grid to map a workload signature of a workload consistent with various embodiments.

FIG. 3 is a block diagram illustrating an example of training a two-dimensional grid to map a workload signature of a workload consistent with various embodiments. The example 300 includes a two-dimensional grid 310 of size m×n. Thus, the grid 310 can be of various sizes, for example, 100×100, 100×150, 200×200, etc. In some embodiments, the grid 310 is similar to the grid 210 of FIG. 2. In some embodiments, the workload signature 305 is a sixty-four bit vector. As described earlier, the workload signature can include several parameters. Each of the sixty-four bits holds a value of a particular parameter of the workload. Additional details of the workload signature are described below with reference to FIG. 7.

The Kohonen SOM technique is vector quantization process in which the dimensionality of a vector is reduced. The Kohonen SOM technique can classify data without "supervision". In the grid 310, each cell has a specific topological position (for example, an x, y coordinate in the grid) and contains a vector of weights of the same dimensionality as the workload signature. That is, if the workload signature consists of a vector, V, of n dimensionality: V1, V2, V3 ... Vn, then each cell in the grid 310 will contain a corresponding weight vector W, of n dimensionality: W1, W2, W3 ... Wn.

The Kohonen SOM technique selectively optimizes the area of the grid, where the weights of the cells match the workload signature vector, to more closely resemble the workload signature vector. After an initial distribution of random weights and many iterations, the SOM eventually settles into a map of stable zones. A zone "cluster" is a feature (category of workload) classifier that renders a graphical output as a type of feature map of the input vectors. For example, as illustrated in FIG. 2, the clusters, which can be rendered in different colors, represent the individual zones or categories of workloads. Any new, previously unseen workload signature vectors presented to the grid 310 will stimulate cells in the zone with similar weight vectors and create a new cluster.

More specifically, training of the grid 310 can occur in several steps and over many iterations. The training can be done with a sample dataset having sample workload signatures of workloads of known categories. In at least some embodiments, the grid 310 can be trained as follows: initially, the cell's weights are initialized, for example, with standardized random values e.g., 0<w<1, where w is weight vector of a cell. Then a sample workload signature vector is chosen at random from the sample dataset and presented to the grid 310.

The grid 310 is examined to determine a cell whose weights are most like the sample workload signature vector. The winning cell is referred to as the best matching unit (BMU). To determine the BMU, one method is to iterate through all the cells and calculate the Euclidean distance between each cell's weight vector and the current sample workload signature vector. The cell with a weight vector closest to the sample workload signature vector is tagged as the BMU. The Euclidean distance is given as:

$$\text{Distance} = \sqrt{\sum_{i=0}^{i=n} (V_i - W_i)^2} \quad (1)$$

where V is the current workload signature vector, W is the weight vector of a cell i, and n is the total number of cells in the grid 310.

After a particular cell is chosen, a radius of the neighborhood of the BMU is calculated. Typically, the radius starts as a large value (for example, to include an area larger than the grid 310 in the neighborhood of the BMU), and diminishes each time a new sample workload signature is processed. The radius is shrunk over time using the equation $$\sigma(t) = \sigma_0 \times \exp(-t/\lambda) \quad (2)$$

where $\sigma_0$ is the width of the grid 310 at time $t_0$
$\lambda$ is a time constant, and
t=1, 2, 3 . . . is the current iteration of the loop (the processing of one workload signature is considered one iteration).

After the radius is determined, all the cells in the grid are iterated to determine if they are within the radius. Any cells within the radius are considered to be inside the neighborhood of BMU. Each neighboring cell's weights are adjusted to make them more like the sample workload signature vector. The closer a cell is to the BMU, the more its weights are altered. In an embodiment, the weights are adjusted using the equation $$W(t+1) = W(t) + \Theta(t)L(s)(V(t) - W(t)) \quad (3)$$

where t is the time-step,
L is the learning rate, which decreases with time, and
Θ represents the amount of influence a cell's distance from the BMU has on its learning rate L.

In other words, the equation (3) indicates that the new adjusted weight for the cell W(t+1) is equal to the old weight (W), plus a fraction of the difference (L) between the old weight and the input workload signature vector (V). The decay of the learning rate is calculated each iteration using the following equation:

$$L(t) = L_0 * \exp(-t/\lambda) \quad (4)$$

Further, Θ(t) is given by Equation:

$$\Theta(t) = \exp(-\text{dist}^2/2\sigma^2(t)) \quad (5)$$

Where dist is the distance a cell is from the BMU,
σ, is the width of the neighborhood function as calculated in (2), and
Θ also decays over time The above steps are repeated, e.g., for all the sample workload signature vectors from the sample dataset. The number of sample workload signatures that are evaluated can be a predefined number. Over a period of time, the neighborhood will shrink to the size of just one cell—the BMU. That is, the workload signature will map to a single cell in the grid 310. Accordingly, after the grid 310 is trained with the predefined number of workload signatures, the workload signatures of a particular category (e.g., workload signatures with similar values) start getting mapped to cells in a particular neighborhood/cluster.

The techniques such as Kohonen SOM and the equations (e.g., for determining the BMU, the neighborhood, the radius, etc.) used in the above embodiments to train the grid 310 to map a particular workload signature to a particular cell of the grid 310 are just examples. In various embodiments, other techniques and equations that achieve the purpose of mapping a particular high-dimensionality vector to a low-dimensionality grid may be used.

Figure 4:
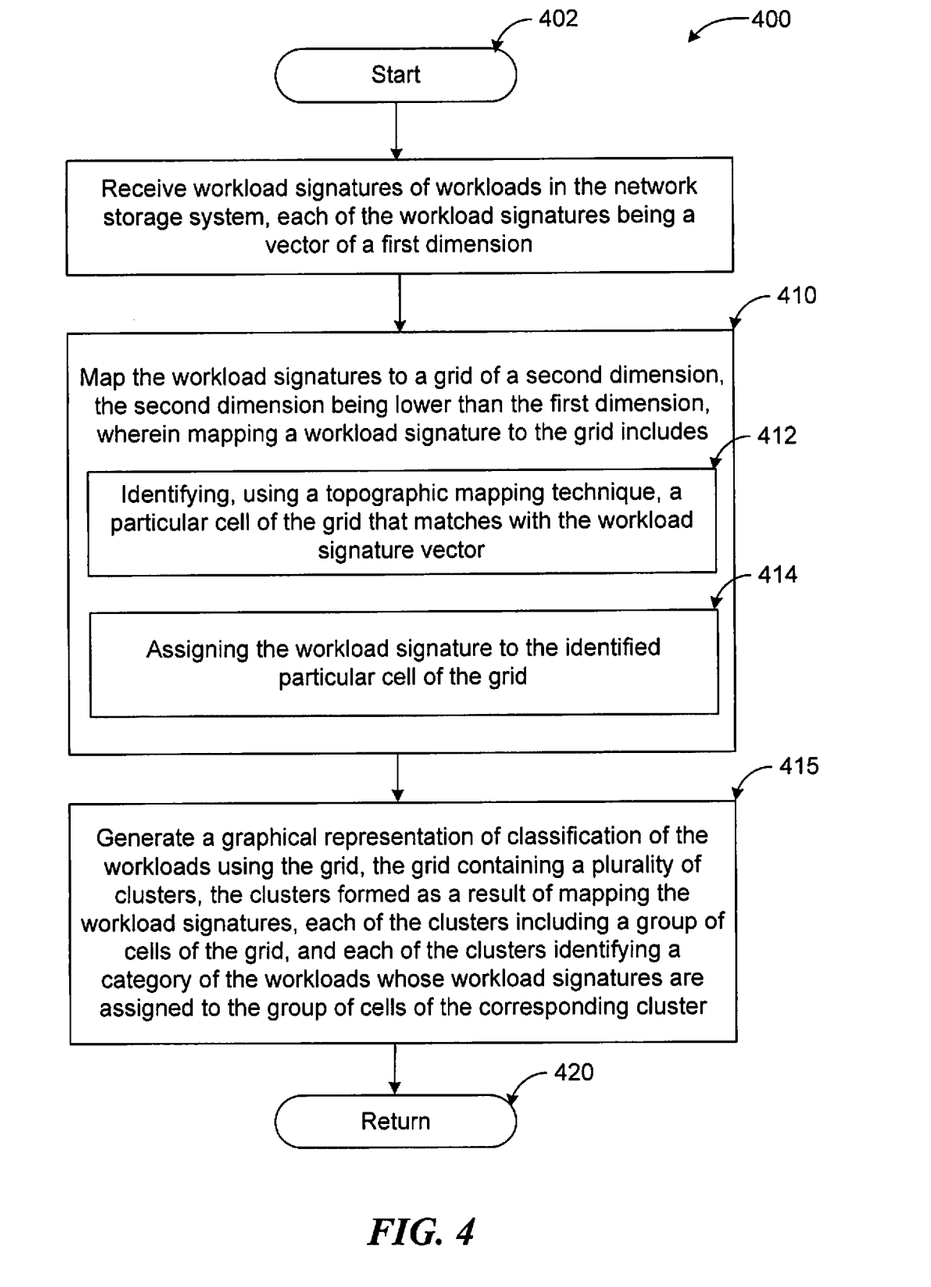
FIG. 4 is a flow diagram illustrating a process of generating a graphical representation of classification of workloads consistent with various embodiments.

FIG. 4 is a flow diagram illustrating a process of generating a graphical representation of classification of workloads consistent with various embodiments. The method 400 may be executed in a computing system, e.g., the network storage system 100 of FIG. 1. The method 400 begins at block 402. At block 405, workload signatures workloads are received. A workload signature is a high-dimensionality entity. In some embodiments, the workload signature is a sixty-four bit vector. At block 410, the workload signature is mapped to a lower dimensionality grid, e.g., grid 210 of FIG. 2. The grid 210 is, for example, a two-dimensional grid. Further, the grid 210 can be of a specified size, (m×n). In an embodiment, the high-dimensionality workload signature is mapped to the low-dimensionality grid using a topographic mapping technique, e.g., Kohonen SOM.

Referring again to block 410, mapping the workload signature to the grid 210 includes identifying a particular cell of the grid 210 that matches with the workload signature (block 412), and assigning the workload signature to the particular cell (block 414). The process of identifying a cell and assigning the cell to the workload signature is repeated for all the workload signatures. In the mapping process, workload signatures with similar values, that is, workloads of a particular category, are mapped to adjacent cells in a particular region of the grid, forming a cluster that represents the particular category of the workload. At block 415, a graphical representation of the classification of the workloads is generated using the grid 210. The grid 210 includes a number of clusters formed as a result of the mapping process. Each cluster represents a specific category of the workload. In an embodiment, each of the clusters in the grid can be annotated with the corresponding category names. Additionally or alternatively, the clusters can be represented in different colors to distinguish between various categories. At block 420, the method 400 returns.

Though the above topographical mapping of the workload signature to the grid 210 is described using Kohonen SOM technique, the mapping is not limited to Kohonen SOM technique. Various other topographical mapping techniques that map a high-dimensionality space to a low-dimensionality space may be used for mapping the workload signatures to the grid. Further, in some embodiments, the grid 210 may be trained/calibrated using sample workload signatures of workloads of known categories in order to distinguish between various classifications. Also, in some embodiments, the training of the grid 210 may be performed prior to mapping the workload signatures using the method 400.

Those skilled in the art will appreciate that the logic illustrated in FIG. 4 and described above, and in each of the flow diagrams discussed below, may be altered in various ways. For example, the order of the logic may be rearranged, substeps may be performed in parallel, illustrated logic may be omitted, other logic may be included, etc.

Figure 5:
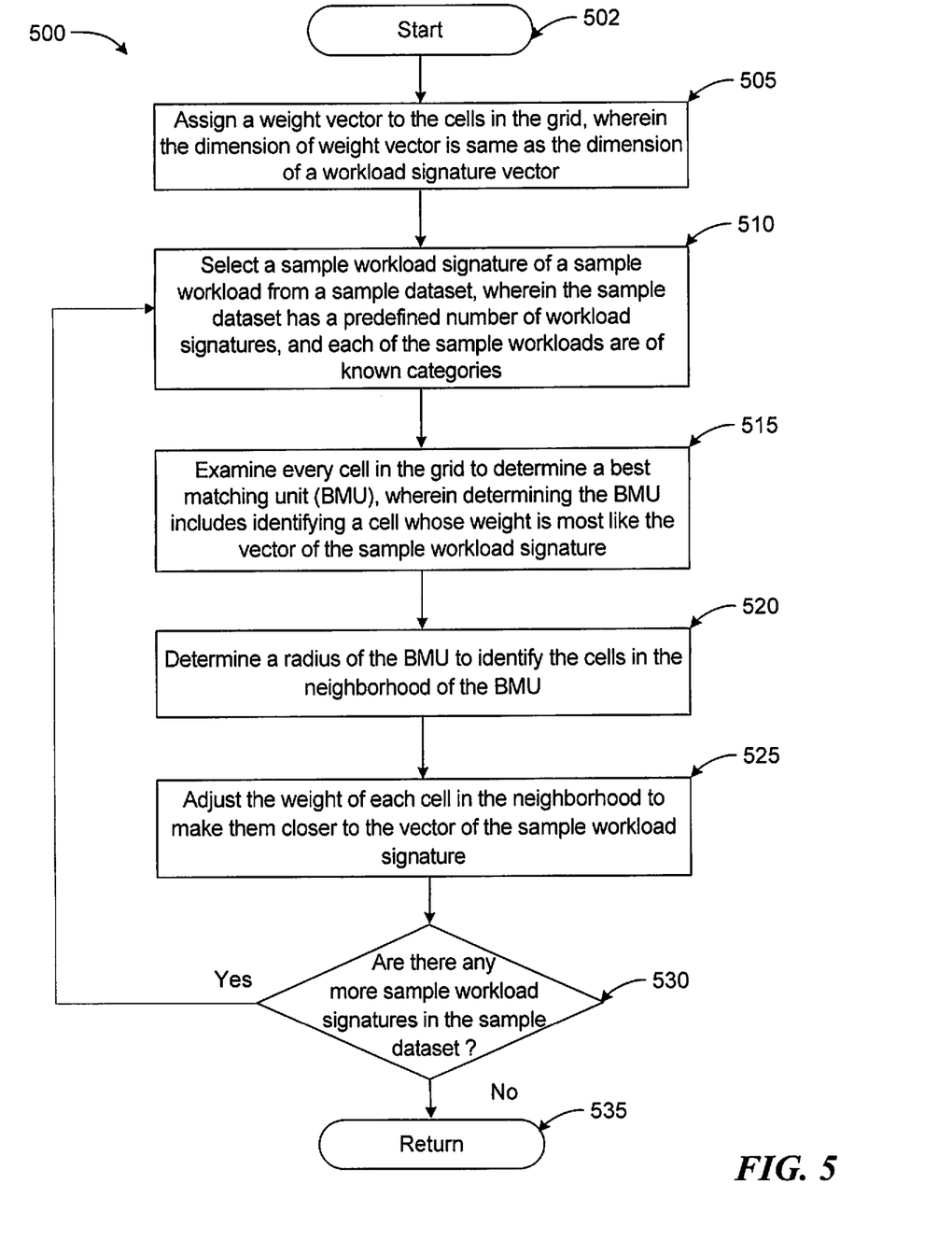
FIG. 5 is a flow diagram illustrating a process of training the grid to classify the workloads consistent with various embodiments.

FIG. 5 is a flow diagram illustrating a process of training the grid to classify the workloads consistent with various embodiments. The process 500 may be executed in a computing system, e.g., network storage system 100 of FIG. 1 and on a grid, e.g., grid 210 of FIG. 2. In an embodiment, if the grid 210 is of size (m×n), then the number of cells in the grid will be a product of m and n. The grid 210 is trained using a sample data set which has a predefined number of sample workload signatures of workloads across various known categories. Further, the sample data set has at least one workload signature for every category.

The method 500 begins at block 502. At block 505, cells of the grid 210 (e.g., each of the cells) are assigned a weight. In an embodiment, the weight is a vector having the same dimensionality as a sample workload signature of the sample data set. The weight vector of each of the cells can be initialized with random values. At block 510, a sample workload signature is selected from the data set. At block 515, cells of the grid 210 are (e.g., on every cell) examined to determine which of the cells is "closer." A cell whose weights are similar to the values of the parameters in the sample workload signature to the sample workload signature is closer. In an embodiment, such a cell is identified as a function of the Euclidean distance between each cell's weight vector and the sample workload signature vector. The cell with a weight vector closest to the sample workload signature vector is tagged as the BMU.

At block 520, a radius of the neighborhood of the identified cell is determined. In an embodiment, cells found within the radius are considered to be inside the neighborhood of BMU. Typically, the radius starts as a large value (e.g., an area encompassing the grid 210 in the neighborhood of the BMU), each time a new sample workload signature is processed—but diminishes (ultimately to just the BMU.

After the radius is determined, at block 525, the weights of neighboring cells within the radius of the BMU are adjusted to make them more like the sample workload signature vector. In some embodiments, the closer a cell is to the BMU, the more its weights are altered.

At decision block 530, the method 500 determines if there are any more sample workload signatures in the sample data set to be processed. If there are more sample workload signatures to be processed, the method 500 continues at block 510. If there are no more sample workload signatures in the sample data set, the method 500 returns at block 535. In some embodiments, the higher the number of the sample workload signatures, the greater will be the probability of a workload being classified into a single category more precisely.

At this point, the grid 210 is trained with the workload signatures for various known categories. The grid 210 will now have various clusters representing various categories of the workloads form the sample data set. A user, e.g., an administrator, can then calibrate all the different clusters with corresponding category names. Alternatively, the technology may categorize the clusters automatically, e.g., using process names or other identifiers. After the calibration, any new workload signature mapped to the grid 210 can be assigned a single cell, and the category of the workload can be identified based on the cluster to which the assigned single cell belongs.

Figure 6:
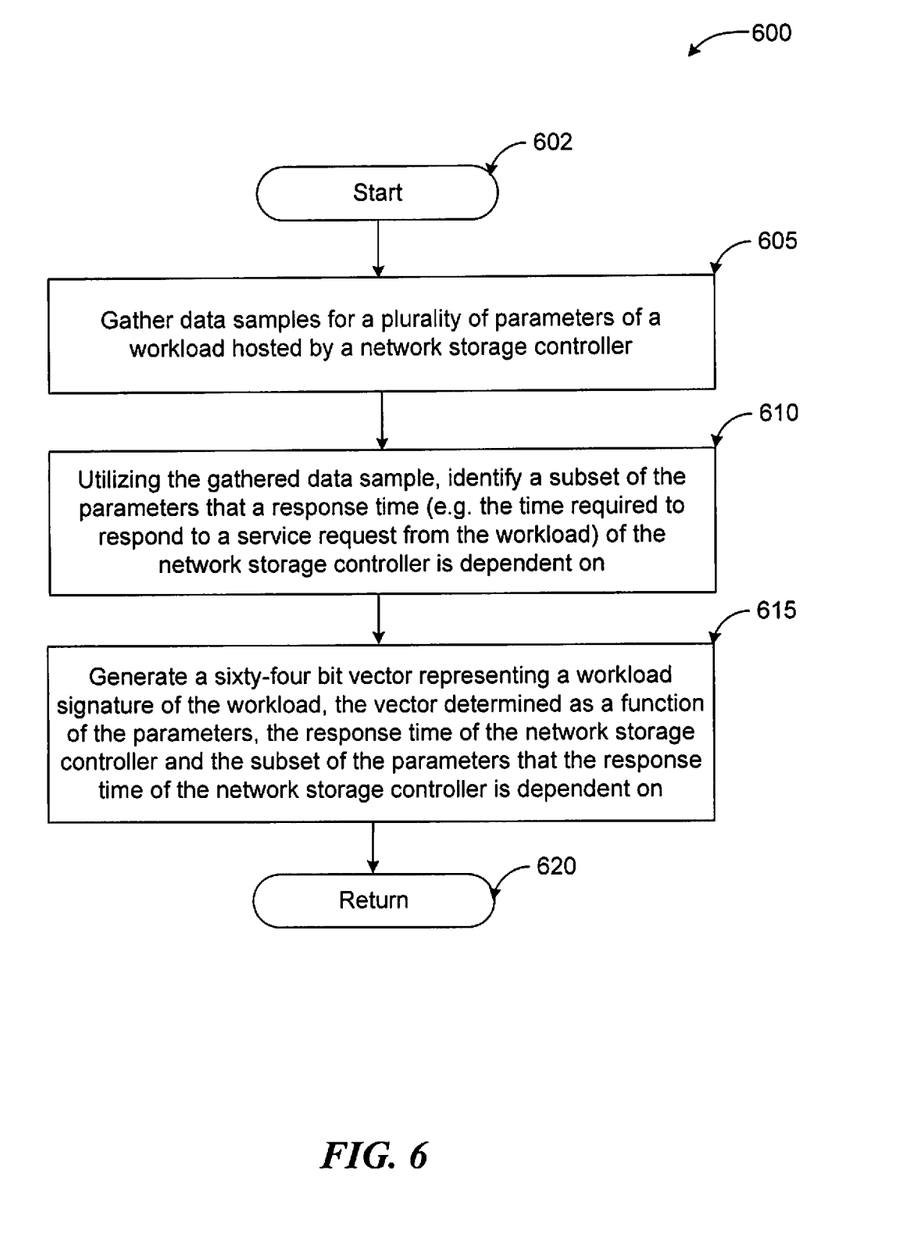
FIG. 6 is a flow diagram illustrating a process for creating a workload signature of a workload consistent with various embodiments.

FIG. 6 is a flow diagram illustrating a process for creating a workload signature of a workload consistent with various embodiments. The method 600 may be executed in a computing system e.g., network storage system 100 of FIG. 1. As described with reference to FIG. 1, the workload signature is a high-dimensionality vector that contains values of parameters of a particular workload.

The method 600 begins at block 602. At step 605, the workload manager 104 gathers data samples of the values of the parameters. Some embodiments, the parameters can include percentage of read operations carried out by the workload within the time period (e.g., 10 sec) the sample was measured ("read percentage"), percentage of write operations carried out by the workload within the sample's time period ("write percentage"), percentage of other operations carried out by the workload within the sample's time period ("other percentage"), the average size of data read by the various read operation within the sample's time period ("read IO size"), the average size of data written by the various write operation within the sample's time period ("write IO size"), the percentage of random read operations (e.g., operations with read IO size smaller than a certain minimum threshold, e.g., 16 KB) carried out by the workload within the sample's time period ("random read percentage"), the percentage of random write operations (e.g., operations with write IO size smaller than a certain minimum threshold, e.g., 16 KB) carried out by the workload within the sample's time period ("random write percentage"), etc.

At block 610, the workload manager 104 determines a subset of parameters that are significant for predicting a response time (e.g., parameters the response time is dependent on) of the storage system 100 based on the values sampled at block 605. In some embodiments, the response time or a latency of the storage system 100 can be defined as the time taken by the storage system to respond to a service request from the workload. In some embodiments, the subset of parameters that are significant for predicting the response time of the storage system 100 is determined using one or more techniques, e.g., classification and regression tree ("CART") modeling, k-means clustering, etc.

At block 615, the method 600 generates the workload signature as a function of the sampled parameter values, the response time and the subset of parameters that are significant for predicting the response time of the storage system for the workload. The method 600 returns at block 620. In some embodiments, the workload signature is generated as a sixty-four bit vector, which is illustrated in FIG. 7. It should be noted that the disclosed technique for creating a workload signature is one such technique. However, the method 400 of graphically representing the classification of workloads, is not limited to, restricted by, and/or dependent on a specific method (including method 600) for creating the workload signature. The method 400 receives, among other parameters, a workload signature that is represented as a high-dimensionality (that is having dimensionality greater than that of the grid it is mapped to) vector.

FIG. 7 is a bit vector diagram illustrating an example of a sixty-four bit workload signature and a workload parameter bit definition table. Each bit (or a bin) in the bit vector 705 represents a data range (column 714) of one of the workload parameters (column 712), as defined in workload parameter bit definition table 710. In some embodiments, the workload parameters in column 712, e.g., read percentage, write percentage, other percentage, random read percentage and random write percentage can each be split into 10 different bins (a total of 50 bins) of various percentage ranges, e.g., 0-10%, 10-20%, 20-30%, . . . , 90-100%, and be represented by a corresponding bit in the 64-bit bit vector 705 of the data sample. Similarly, the read IO size and write IO size of the workload parameters 712 can each be split into 7 different bins (a total of 14 bins) of various data ranges, e.g., 0-2 KB, 2-4 KB, 4-8 KB, 8-16 KB, 16-32 KB, 32-64 KB, and >64 KB, and be represented by a corresponding bit in the 64-bit vector of the workload signature 705.

In some embodiments, the workload manager 104 populates the 64-bit vector by determining which bin the sampled values of the workload parameters for that data sample falls into and sets that bit to "1" while leaving the rest at a default "0." According to table 710, in the workload signature 705, bits 1-10 represent read percentage, bits 11-20 represent write percentage, bits 21-30 represent other percentage, bits 31-40 represent random read percentage, bits 41-50 represent random write percentage, bits 51-57 represent write IO size and bits 58-64 represent read IO size.

For example, when the workload parameter read percentage has a value of 46% in a data sample, the workload manager 104 sets bit #5 of the 64-bit vector, which corresponds to the percentage bin 40-50% of the workload parameter read percentage, to "1" and leaves the rest of the 9 bins of read percentage that correspond to other percentages at "0". The workload manager 104 thus gathers at least 64 workload parameter bins.

While FIG. 7 illustrates a table 710 whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Figure 8:
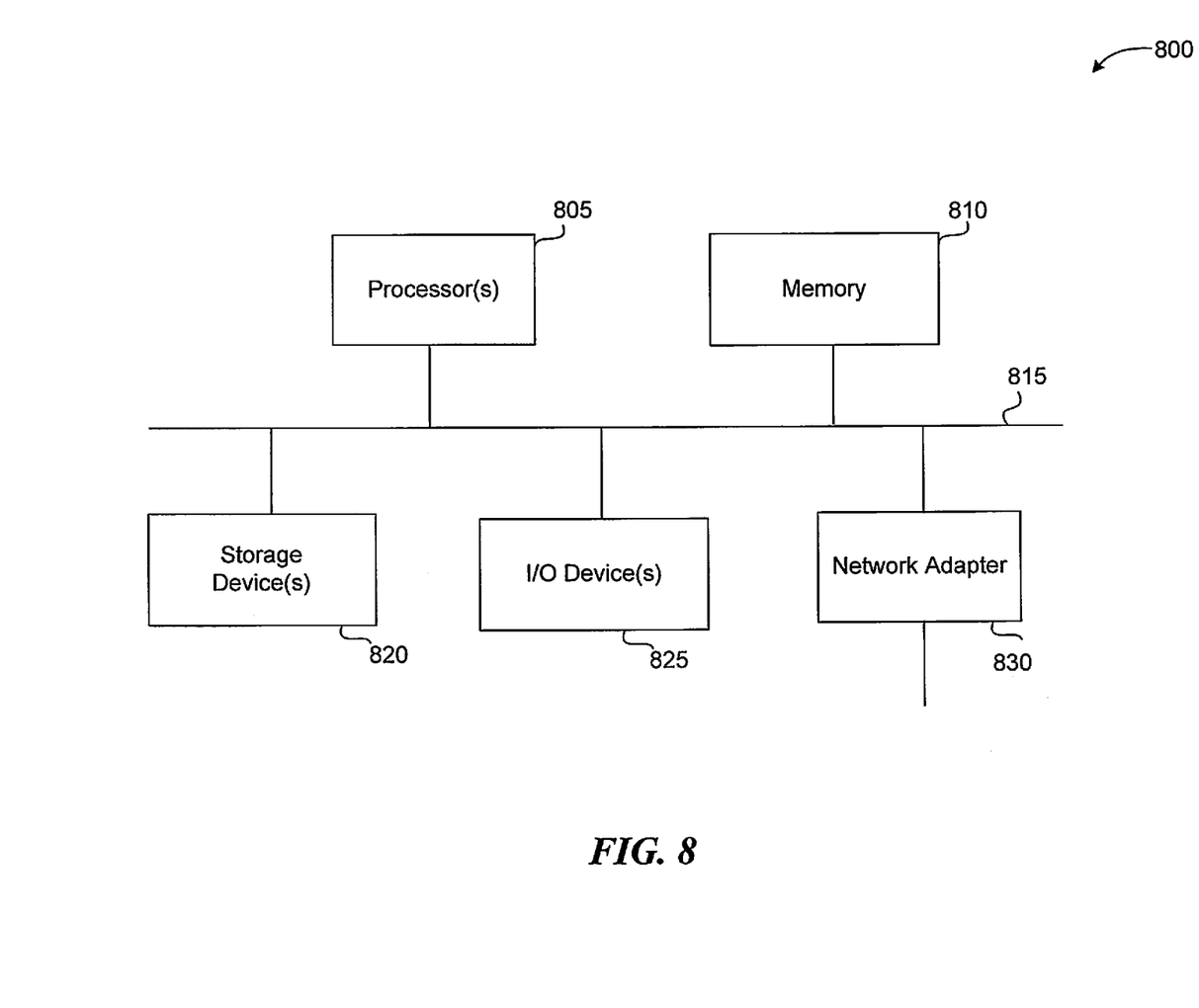
FIG. 8 is a block diagram illustrating components of an apparatus that may perform various operations described by the technology.

FIG. 8 is a block diagram illustrating components of an apparatus that may perform various operations described by the technology. The illustrated apparatus can represent any computer or processing system described herein. The processing system 800 is a hardware device on which any of the entities, components or services depicted in the examples of FIGS. 1-7 (and any other components described in this specification), e.g., workload manager 104, workload signature mapping unit 105, etc. can be implemented. The illustrated processing system 800 includes one or more processors 805 and memory 810 coupled to an interconnect 815. The interconnect 815 is illustrated in FIG. 8 as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 805 is/are the central processing unit (CPU) of the processing system 800 and, thus, control the overall operation of the processing system 800. In some embodiments, the processor(s) 805 accomplish this by executing software or firmware stored in memory 810. The processor(s) 805 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 810 is or includes the main memory of the processing system 800. The memory 810 represents any form of random access memory (RAM), read-only memory (ROM), flash memory, or the like, or a combination of such devices. In use, the memory 810 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 805 through the interconnect 815 are a network adapter 830, a storage device(s) 820 and I/O device(s) 825. The network adapter 830 provides the processing system 800 with the ability to communicate with remote devices, over a network and may be, for example, an Ethernet adapter or Fibre Channel adapter. The network adapter 830 may also provide the processing system 800 with the ability to communicate with other computers within the cluster. In some embodiments, the processing system 800 may use more than one network adapter to deal with the communications within and outside of the cluster separately.

The I/O device(s) 825 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 810 can be implemented as software and/or firmware to program the processor(s) 805 to carry out actions described above. In certain embodiments, such software or firmware may be initially provided to the processing system 800 by downloading it from a remote system through the processing system 800 (e.g., via network adapter 830).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 820 includes, for example, recordable/non-recordable media (e.g., ROM; RAM; magnetic disk storage media; optical storage media; flash memory devices; solid state medium etc.), etc., or any combination thereof. The storage medium typically may be non-transitory or include a non-transitory device. In this context, a non-transitory storage medium may include a device that is tangible, meaning that the device has a physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

The terms "component", "module", "system," and the like as used in this disclosure are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable medium including, but not limited to, an application specific integrated circuit (ASIC), compact disc (CD), digital video disk (DVD), read only memory (ROM), floppy disk, hard disk, electrically erasable programmable read only memory (EEPROM), memory stick, flash memory device or any other non-volatile memory device, or any other storage device, in accordance with the claimed subject matter.

Although embodiments of the disclosure are not limited in this regard, the term "Virtual Machine" (VM) as used herein may include one or more environments able to emulate, simulate, virtualize, execute, directly execute, run, implement, or invoke a hardware component, a software component, an Operating System (OS), an application, a code, a set of instructions, or the like. The VM may be implemented using hardware components and/or software components. In one example, the VM is implemented as a software application executed by a processor, or as a hardware component integrated within a processor.

Although embodiments of the disclosure are not limited in this regard, the term "software service" as used herein may include an environment, program, application, process, procedure, function, object, and/or task capable of using one or more resources. In one example, the software service may include a VM. In another example, the software service may include an application, a program, and/or an application program, which may be associated with an OS, or an OS kernel.

Although embodiments of the disclosure are not limited in this regard, the term "resource" as used herein may include any suitable device, apparatus, article, unit, system, sub-system, module, component, and/or medium to be used by a software service. The resource may be implemented as a physical hardware resource, e.g., using any suitable mechanical, magnetic, electrical, or electronic device, module, unit, component or system; as a virtualized hardware resource, e.g., using any suitable virtualization method; and/or as a software resource.

What is claimed is:

1. A method, comprising:
    receiving, at a processing device in a network storage system, workload signatures corresponding to workloads in the network storage system, each of the workload signatures being a vector having a first dimensionality and each workload signature classifies a runtime workload based on data gathered by sampling operations associated with the workload and comprises of a plurality of parameters associated with the workload, a response time by a network controller of the network storage system to respond to the workload and at least one parameter that is significant for predicting the response time, and the at least one parameter is determined using statistical analysis of a plurality of sampled values to determine a correlation of the at least one parameter to the response time;
    mapping, by the processing device, each of the workload signatures to a grid of a second dimensionality, where the grid is trained using a sample data set with predefined number of sample workload signatures across known workload categories, and the second dimensionality being lower than the first dimensionality, the mapping including:
        identifying, based on the vector of a particular workload signature, a particular cell of the grid that matches with the vector, the identifying including determining whether the particular cell matches with the vector based on a weight vector associated with the particular cell, and
        assigning the particular workload signature to the particular cell; and
    generating, by the processing device, a graphical representation of classification of the workloads using the grid, the grid containing clusters, the clusters formed by mapping the workload signatures, each of the clusters including a group of cells of the grid and identifying a category of the workloads whose workload signatures are assigned to the group of cells of the corresponding cluster.

2. The method of claim 1, wherein mapping the workload signatures includes mapping the workload signatures with similar vectors to adjacent cells in a common region of the grid, the region forming one of the clusters.

3. The method of claim 2 further comprising:
    receiving, at regular intervals of time, a new set of workload signatures of the workloads; and
    updating, at regular intervals of time, the graphical representation to indicate the classification of the workloads at a given interval of time.

4. The method of claim 2, further comprising:
    generating, by the processing device, a report including analytics of the workloads in the network storage system.

5. The method of claim 1, wherein mapping the workload signature to the grid of a second dimensionality includes:
    calibrating, by the processing device and using a topographic mapping technique, the grid using a sample data set, the sample data set including multiple sample workload signatures of multiple sample workloads, the sample workloads categorized into predefined categories, the sample data set including at least one sample workload signature in each of the categories, the calibrating including for each of the categories, assigning the sample workload signatures to cells in the grid, the cells forming a first cluster in the grid, and identifying the first cluster as representing the corresponding category of the sample workload.

6. The method of claim 5, wherein calibrating the grid includes calibrating the grid before mapping the workload signatures to the grid.

7. The method of claim 1, wherein receiving the workload signatures includes:
sampling, by the processing device and for a specified duration, values for parameters of a workload of the workloads,
determining, based at least in part on the sampled values, a subset of the parameters for predicting a response time of a network storage controller executing the workload, the response time being the time required for the network storage controller to respond to a service request from the particular workload, and
generating, by the processing device, the vector of the workload signature as a function of the values of the parameters, the response time, and the subset of the parameters.

8. The method of claim 7, wherein the parameters include at least one of
a percentage of read operations of a total operation performed by the corresponding workload;
a percentage of write operations of the total operations performed by the corresponding workload;
a percentage of the total operations that are neither read nor write performed by the corresponding workload;
an average size of data read by the corresponding workload;
an average size of data written by the corresponding workload;
a percentage of random read operations of a total real operation performed by the corresponding workload; or
a percentage of random write operations of a total write operation performed by the corresponding workload.

9. The method of claim 8, wherein at least some of the parameters of the workload signatures mapped to the same cluster have similar values.

10. The method of claim 7, wherein the first dimensionality of the vector is of size sixty four.

11. The method of claim 10, wherein the parameters are represented in the vector as sixty four bits.

12. The method of claim 1, wherein the grid of the second dimensionality is a two-dimensional grid of a predefined size.

13. The method of claim 1, wherein each of the workloads is executing on at least one of a disk of a network storage controller, an aggregate of the network storage controller, or a volume of the aggregate.

14. The method of claim 1 further comprising:
receiving a new set of workload signatures of a new set of workloads;
mapping, using a topography mapping technique, the new set of workload signatures to the grid;
determining if a new cluster is formed by mapping the new set of workload signatures; and
responsive to a determination that the new cluster is formed in the grid, identifying the new cluster as representing a new category of the new set of workloads, the new category being different from categories of previously mapped workload signatures.

15. A non-transitory, machine readable medium having stored thereon instructions comprising machine executable code which when executed by a machine, causes the machine to:

receive, at a processing device in a network storage system, workload signatures corresponding to workloads in the network storage system, each of the workload signatures being a vector having a first dimensionality and each workload signature classifies a runtime workload based on data gathered by sampling operations associated with the workload and comprises of a plurality of parameters associated with the workload, a response time by a network controller of the network storage system to respond to the workload and at least one parameter that is significant for predicting the response time, and the at least one parameter is determined using statistical analysis of a plurality of sampled values to determine a correlation of the at least one parameter to the response time;
map, by the processing device, each of the workload signatures to a grid of a second dimensionality, where the grid is trained using a sample data set with predefined number of sample workload signatures across known workload categories, and the second dimensionality being lower than the first dimensionality, the mapping includes:
identify, based on the vector of a particular workload signature, a particular cell of the grid that matches with the vector, the identifying including determining whether the particular cell matches with the vector based on a weight vector associated with the particular cell, and
assign the particular workload signature to the particular cell; and
generate, by the processing device, a graphical representation of classification of the workloads using the grid, the grid containing clusters, the clusters formed by mapping the workload signatures, each of the clusters including a group of cells of the grid and identifying a category of the workloads whose workload signatures are assigned to the group of cells of the corresponding cluster.

16. The non-transitory storage medium of claim 15, wherein mapping the workload signature to the grid of a second dimensionality includes:
calibrating, by the processing device and using a topographic mapping technique, the grid using a sample data set, the sample data set including multiple sample workload signatures of multiple sample workloads, the sample workloads categorized into predefined categories, the sample data set including at least one sample workload signature in each of the categories, the calibrating including for each of the categories,
assigning the sample workload signatures to cells in the grid, the cells forming a first cluster in the grid, and
identifying the first cluster as representing the corresponding category of the sample workload.

17. The non-transitory, storage medium of claim 15, wherein receiving the workload signatures includes:
sampling, by the processing device and for a specified duration, values for parameters of a workload of the workloads,
determining, based at least in part on the sampled values, a subset of the parameters for predicting a response time of a network storage controller executing the workload, the response time being the time required for the network storage controller to respond to a service request from the particular workload, and generating, by the processing device, the vector of the workload signature as a function of the values of the parameters, the response time, and the subset of the parameters.

18. A system, comprising:
a memory containing machine readable medium comprising machine executable code having stored thereon instructions; and a processing device in a networked storage system coupled to the memory, the processor device configured to execute the machine executable code to:
  receive workload signatures corresponding to workloads in the network storage system, each of the workload signatures being a vector having a first dimensionality and each workload signature classifies a runtime workload based on data gathered by sampling operations associated with the workload and comprises of a plurality of parameters associated with the workload, a response time by a network controller of the network storage system to respond to the workload and at least one parameter that is significant for predicting the response time, and the at least one parameter is determined using statistical analysis of a plurality of sampled values to determine a correlation of the at least one parameter to the response time;
  map each of the workload signatures to a grid of a second dimensionality, where the grid is trained using a sample data set with predefined number of sample workload signatures across known workload categories, and the second dimensionality being lower than the first dimensionality, the mapping includes:
    identify, based on the vector of a particular workload signature, a particular cell of the grid that matches with the vector, the identifying including determining whether the particular cell matches with the vector based on a weight vector associated with the particular cell, and
    assign the particular workload signature to the particular cell; and
  generate a graphical representation of classification of the workloads using the grid, the grid containing clusters, the clusters formed by mapping the workload signatures, each of the clusters including a group of cells of the grid and identifying a category of the workloads whose workload signatures are assigned to the group of cells of the corresponding cluster.

19. The system of claim 18, wherein mapping the workload signature to the grid of a second dimensionality includes:
  calibrating, by the processing device and using a topographic mapping technique, the grid using a sample data set, the sample data set including multiple sample workload signatures of multiple sample workloads, the sample workloads categorized into predefined categories, the sample data set including at least one sample workload signature in each of the categories, the calibrating including for each of the categories,
    assigning the sample workload signatures to cells in the grid, the cells forming a first cluster in the grid, and
    identifying the first cluster as representing the corresponding category of the sample workload.

20. The system of claim 19, wherein receiving the workload signatures includes:
  sampling, by the processing device and for a specified duration, values for parameters of a workload of the workloads,
  determining, based at least in part on the sampled values, a subset of the parameters for predicting a response time of a network storage controller executing the workload, the response time being the time required for the network storage controller to respond to a service request from the particular workload, and
  generating, by the processing device, the vector of the workload signature as a function of the values of the parameters, the response time, and the subset of the parameters.

* * * * *